United States Patent [19]
Rutz et al.

[11] Patent Number: 5,390,398
[45] Date of Patent: Feb. 21, 1995

[54] FOIL STRETCHING MACHINE FOR SHRINKING FOILS

[75] Inventors: Andreas Rutz; Rudolf Langer, both of Lindau, Germany

[73] Assignee: Lindauer Dornier Gesellschaft mbH, Lindau, Germany

[21] Appl. No.: 915,000

[22] Filed: Jul. 16, 1992

[51] Int. Cl.$^6$ .............................................. D06C 3/00
[52] U.S. Cl. .............................................. 26/93; 26/72; 26/86
[58] Field of Search .................. 26/18.5, 73, 71, 86, 26/93, 94, 72, 52, 18.5, 51; 264/288.4, 289.6, 290.2, 342 RE

[56] References Cited

U.S. PATENT DOCUMENTS

| | | |
|---|---|---|
| 4,637,103 | 1/1987 | Hutzenlaub .......................... 26/73 |
| 4,890,365 | 1/1990 | Langer ................................. 26/73 |
| 5,081,750 | 1/1992 | Molz .................................... 26/73 |
| 5,267,378 | 12/1993 | Wellenhofer et al. ................ 26/93 |

Primary Examiner—Clifford D. Crowder
Assistant Examiner—Amy Brooke Vanatta
Attorney, Agent, or Firm—W. G. Fasse; W. F. Fasse

[57] ABSTRACT

A film stretching machine is also capable of shrinking undulating film by gripping film to be treated at its longitudinal edges by pivotable clips which are disposed spaced apart on a chain conveyor and are guided in a chain conveyor guide. The film is shrunk by a longitudinal adjustment of the film areas lying between the gripping members of neighboring clips. In the apparatus, the longitudinal adjustment or shrinking occurs in that each clip is constructed as a pivoting clip and includes a rolling part on which the gripping part is mounted so as to be pivotable about an axis which is disposed parallel to the film plane.

12 Claims, 5 Drawing Sheets

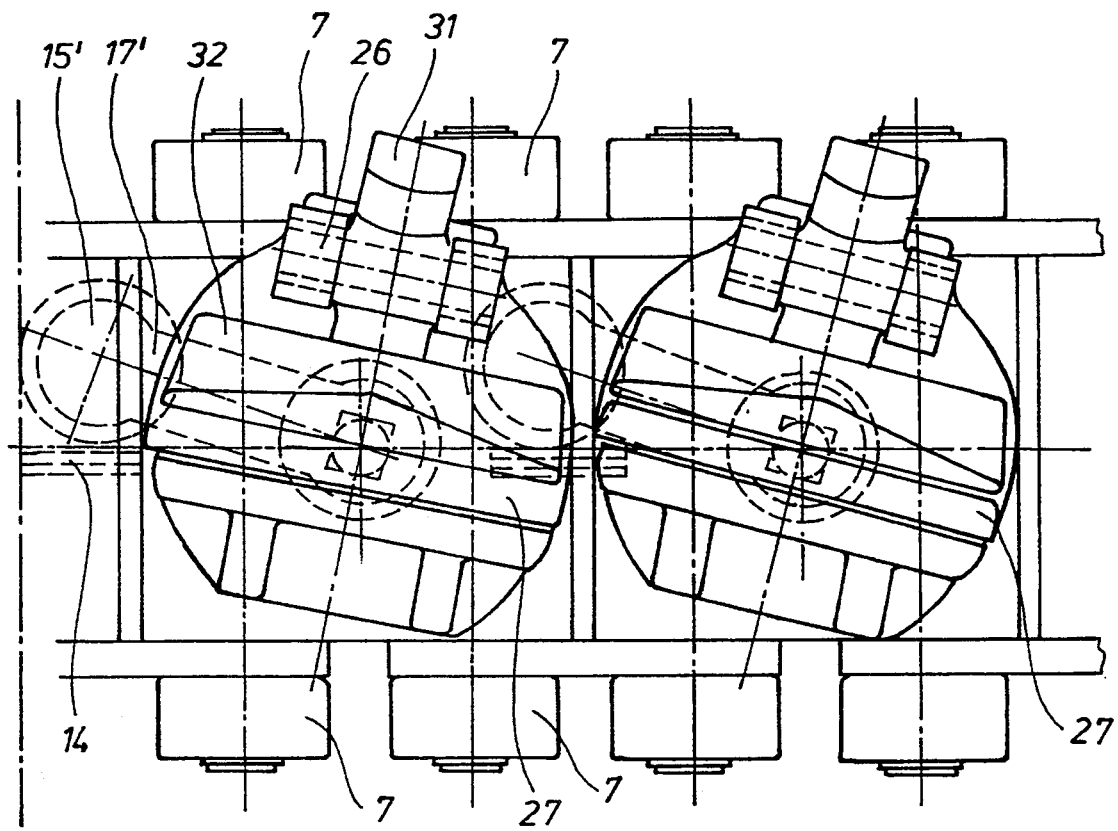
FIG 4
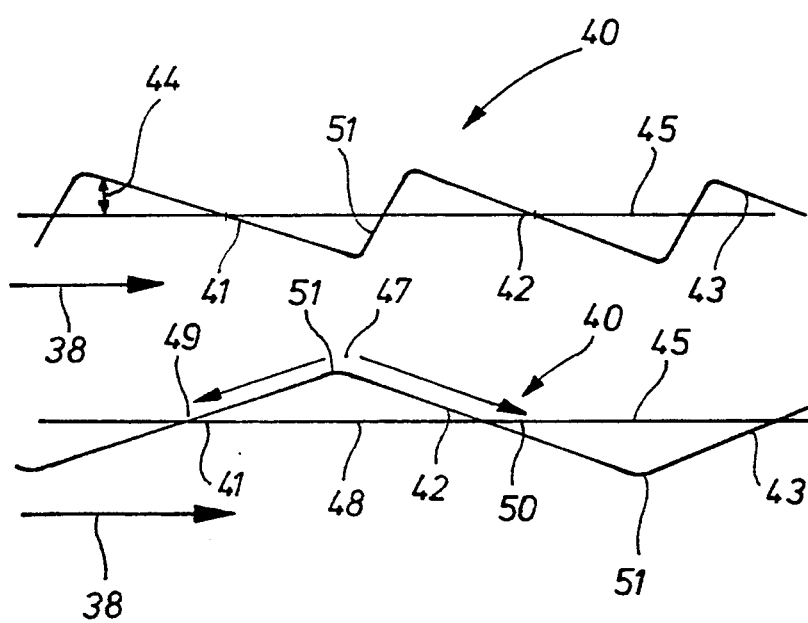
FIG 6
FIG 5

FOIL STRETCHING MACHINE FOR SHRINKING FOILS

FIELD OF THE INVENTION

The invention relates to a device for shrinking synthetic material films especially in the longitudinal film direction when the film travels through a machine which stretches the film in a crosswise direction perpendicularly to the longitudinal film direction.

BACKGROUND INFORMATION

In prior art foil stretching machines, non-pivotable clips or the clamping parts of such clips are used in order to grasp a film to be stretched in the inlet area of the machine, to convey the film in the longitudinal film direction which is the transport direction of the film for stretching the film crosswise within a treatment area of an oven. In order additionally to shrink the film in the longitudinal direction after stretching, it is known to shorten the pitch of the chains for lengthwise shrinking the previously stretched film. However the alteration of the chain pitch is structurally expensive. In addition, the chain has to transfer high forces as a result of which highly stressed connections have to be provided between the chain links.

OBJECT OF THE INVENTION

The present invention therefore has the object of further developing a shrinking device for a film stretching machine of the above mentioned type in such a way that it operates in a substantially more cost efficient way and in a simple manner. The present device shall be particularly suitable for subjecting synthetic material films which are not in the form of a structure having a plane surface, to a specific shrinkage process.

SUMMARY OF THE INVENTION

The device according to the invention is characterized in that a longitudinal adjustment of certain of the film areas is performed in that each clamping clip, each other clamping clip, or each third clamping clip is formed as a pivoting clip, and wherein the gripping part of these clips is formed on a rolling part so as to be pivotable about a journal axis which is disposed parallel to the plane of the film. Preferably, the journal axis is an adjusting shaft. The number of clips constructed for pivoting is determined by the size of the film area needed for treatment.

An important feature of the present invention is the fact that in accordance with the invention the pitch of the chains is now no longer altered. Rather, the clips themselves are in the form of pivoting clips and the film is shrunk by "overfeeding" the transverse amount stretched. This means that use is made of the difference in length between a film strip which is held in an undulating form and a flat film strip.

In accordance with the present invention, therefore, instead of the film being introduced flat into the inlet area of the machine, the film is from the very outset grasped in an undulating manner in the inlet area and transported through the machine in this undulated form.

The film section thus grasped in an undulating manner, is then heated, stretched, prefixed, and then shrunk.

At the moment when the shrinking process is to start, a straight film strip with few undulations is formed from the film strip formed as an undulating film by the pivoting movement of the clips. After the pivoting clips have pivoted, the piece of film between the pivoting clips—more precisely between the clip tables of the individual pivoting clips—is in the form of a plane looping strip and acts as a shrinkage reserve. Shrinking then occurs in this area. With this special arrangement of pivoting clips for shrinking the films, the essential advantage is achieved that the pitch of the chains itself now no longer has to be altered, whereby the advantage is achieved of a relatively simple construction which transmits high forces. The pivoting mechanism of the pivoting clip is simple to produce and operates reliably.

In a further embodiment of the present invention the pivoting clip is constructed to enable the film to be controlled (stretched) in the hottest fixing section of the apparatus, whereby the adjusting mechanism can be guided well along a path defined on both sides. This means that a pivoting clip according to the invention can be used not only for shrinking the film but also for partially stretching the film in the longitudinal direction.

There are several possibilities for the construction of the pivoting clip according to the invention. Thus, in a first preferred embodiment, it is provided that the film is guided in the manner of an undulating strip, which requires the pivoting clips adjacent one another in each position or in each other position, or in each third position to be pivoted relative to one another in respective opposite directions of rotation.

In a second arrangement of the invention it is provided that a saw-tooth like formation is imparted to the film strip, which requires all the pivoting clips to be rotated in the same direction of rotation. Also here it is not necessary to pivot each clip. Every other, or every third clip etc. may be pivoted.

It is characteristic in both embodiments that the pivoting of the clips occurs in a relatively simple manner in that the clip section comprising the clip table is connected in a rotationally rigid manner to an adjusting shaft which bears at the free end a lever. An adjusting roller is disposed at the other end of the lever. The roller rolls on a correspondingly formed track.

The pivoting angle of the clip section bearing the clip table, is thus adjusted by altering the guide path in the vertical direction.

In the case of the embodiments described above it is presupposed that the film strip is grasped and retained in the vicinity of the clip table whereby the clip table is straight.

In another embodiment of the present invention it may further be provided that the clip table is itself divided and comprises two separate sections which are disposed pivotably relative to one another, i.e. the clip table is thus not a uniform member which can be pivoted by itself but comprises two sections, for example, which are mounted at an angle relative to one another, so as to be pivotable, whereby in this area of the clip tables also the clamping length at the film strip is further enlarged. A curve with approximately double the frequency is then produced from the simply sawtoothed or undulating curve It is likewise possible to arrange the control system for the pivoting movement of the individual clips in a different manner, wherein for example more than one guide path is provided, on which one adjusting roller rolls in each case. It is thus possible to associate different pivoting angles with the clips.

In this manner pivoting movements of like clip can be performed in the direction of the stretching movement and in the direction of the shrinking movement.

In the above-described embodiments it was assumed that the clip is pivoted by means of a lever which is connected to the pivotable section of the clip in a rotationally rigid manner wherein the lever is pivoted by an adjusting roller which rolls on a guide path.

In a further embodiment of the present invention it is provided that this clip section is not pivoted by means of a lever and an associated adjusting roller, but that the clip is pivoted by means of a rack-and-pinion guide system for example, whereby the adjusting shaft 19 is provided with a pinion which meshes with a rack disposed so as to be displaceable in a corresponding manner. The rack is then displaceably disposed in the clip body and is mounted at the front end again with a corresponding adjusting roller on a guide path.

BRIEF DESCRIPTION OF THE DRAWINGS

In the following the invention will be described in further detail by way of example with reference to the accompanying drawings, in which:

FIG. 3a shows two neighboring clips tilted toward each other while FIG. 3b shows two neighboring clips in a parallel orientation relative to each other;

FIG. 4 is a variant embodiment with respect to FIG. 3 with clips pivoting in the same direction;

FIG. 5 shows the position of the film strip in an embodiment according to FIG. 3; and FIG. 6 shows the position of the film strip with an embodiment of the pivoting clip according to FIG. 4.

DETAILED DESCRIPTION OF PREFERRED EXAMPLE EMBODIMENTS AND OF THE BEST MODE OF THE INVENTION

Figure 1:
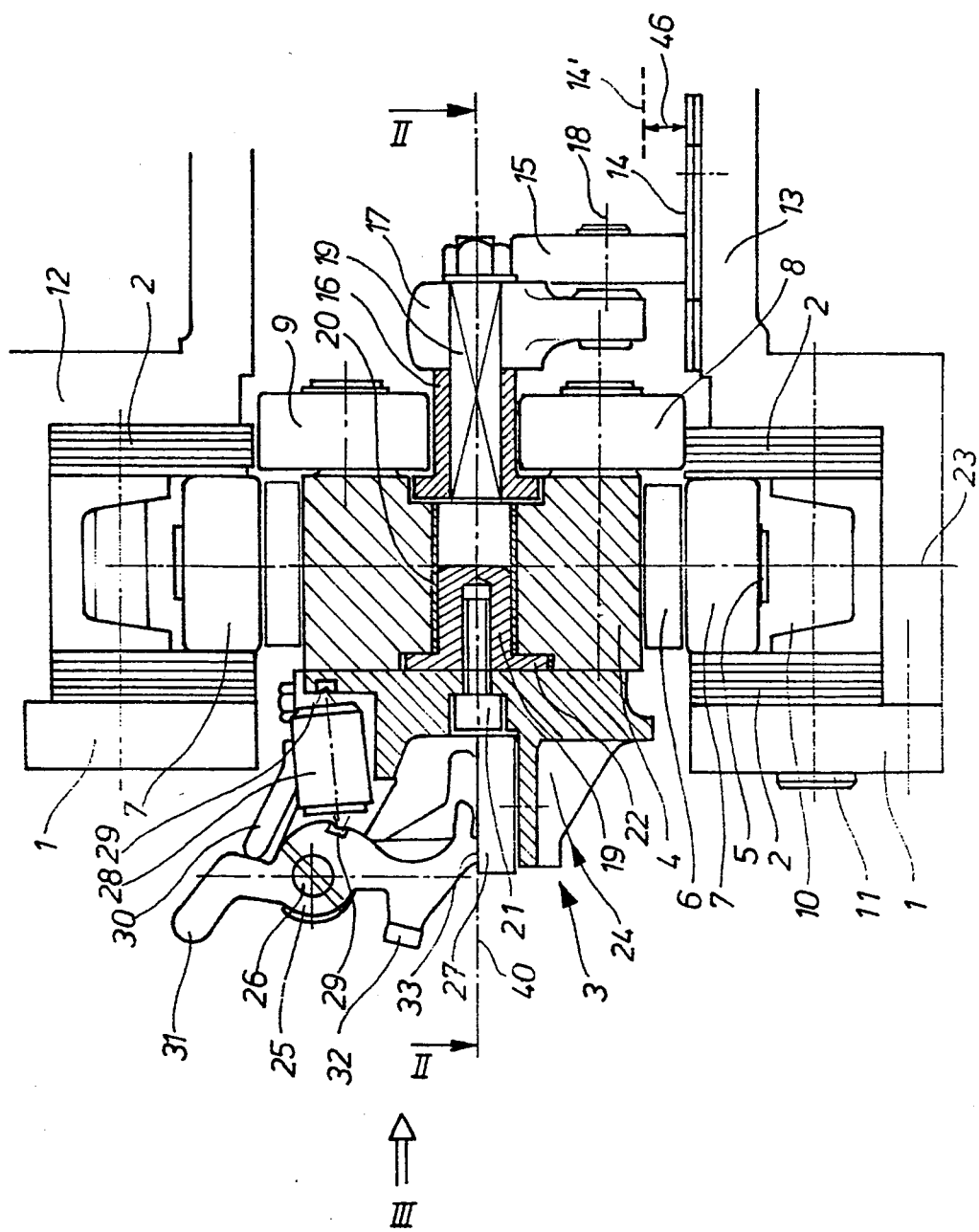
FIG. 1 is a section through a clip according to the invention in the direction of line I—I in FIG. 2.

In FIG. 1, reference number 23 designates the central axis of the guiding chain conveyor. In this connection, one upper and one lower roller 7 run in each case in respective guide paths in the C-shaped chain conveyor guide 1, these guide paths being laterally defined by guide bands 2 which are secured, in each case, to a fastening device 11 at the sides of the chain conveyor guide 1. In a preferred embodiment these guide bands 2 are formed as spring tapes. The upper and lower rollers 7 thus roll in associated recesses in the chain conveyor guides 1.

The chain conveyor guides 1 are part of upper and lower track carriers 12, 13 as illustrated in FIG. 1.

Each clip 3 of the number of clips equipped for the purposes of the invention substantially comprises a pivotable or journalling section 24 forming a gripping part 24 and a fixed section forming rolling part 4 disposed in a non-pivotable manner relative to the pivotable part and connected to the respective tentering chain.

The gripping part 24 is mounted pivotably on the rolling part 4 in that the rolling part 4 is penetrated by an adjusting shaft 19 which is mounted in a bushing 20 so as to be rotatable in the rolling part 4.

Reference is further made to the fact that in the rolling part 4 there is a further bushing 16 forming a spacer 16 which transmits tensile forces, which act on the adjusting shaft 19, to the rolling part or fixed section 4. Furthermore, at the point of transition between the stationary rolling part 4 and the pivotally mounted gripping part 24, a radial flange 22 is formed on the adjusting shaft 19 in order to guide and mount the gripping part 24 on the rolling part 4. In this connection there is secured on one side of the adjusting shaft 19 in a rotationally rigid manner, a lever 17 having a pivotable section with a bolt 18 secured to the pivotable lever section. An adjusting roller 15 is rotatably mounted on the bolt 18. This adjusting roller 15 rolls on a track 14, wherein the track 14 initially assumes the position shown in solid lines in FIG. 1. When moving into the shrinking area of the machine, the track 14 assumes a level which is raised by the distance 46 illustrated at 14' in FIG. 1.

As a result of the adjusting roller 15 moving up to the upper track 14' disposed at a distance 46 above the lower track, the lever 17 is thus pivoted about the adjusting shaft 19, as a result of which the entire gripping part 24 is likewise pivoted with the adjusting shaft 19.

For a better illustration in the drawing, FIG. 1 shows the pivoted position of the entire gripping part 24. The track 14', which is disposed at a distance 46 above the lower track 14, shows the non-pivoted, straight arrangement of the clip table and thus of the entire gripping part 24.

The track 14', which aligns the gripping part 24 in a flat position, is thus disposed in the shrinking area. The gripping part 24 substantially comprises a body, which is connected by a screw 21 in a rotationally rigid manner to the end face of the adjusting shaft 19.

On the upper side of this body a flap 25 is pivotably mounted in a bolt 26. The flap 25 in turn comprises an upper lever section 31 and a lower lever section 32. The entire flap 25 is biased in the closing direction and the opening direction by a dead-center spring 28 which ensures that the flap 25 is held in a spring-loaded manner in its open position and likewise in the closed position illustrated in FIG. 1. The dead-center spring 28 is thus mounted between two bearing edges 29 and is formed as a bending spring for example.

In the closed position the upper lever section 31 abuts without film against a stop bail 30 which is rigid with the gripping part. The lower lever part 32 comprises a downwardly directed gripper 33 which grasps and clamps the film with the straight clip table 27 which is arranged opposite to the gripper 33.

The further guiding elements for guiding the roller part 4 in the chain conveyor guide 1 are formed in a known manner. These guiding elements include a lower supporting roller 8, which takes up the dead weight of the clip and rolls on the end face of the rear lower guide band 2, and also a ring prevention roller 9 which is not necessarily secured to each clip, and which is to prevent the clip 3 from rising in the chain conveyor guide 1. This rising prevention roller 9 rolls on the lower end face of the rear upper guide band 2 according to FIG. 1.

The individual clips are connected to one another by the respective chain bolts 5 and by upper and lower chain link plates 6. The chain bolt 5 is rotatably mounted in the rolling part 4 and is connected to the link plates 6 in a rotationally rigid manner.

Figure 2:
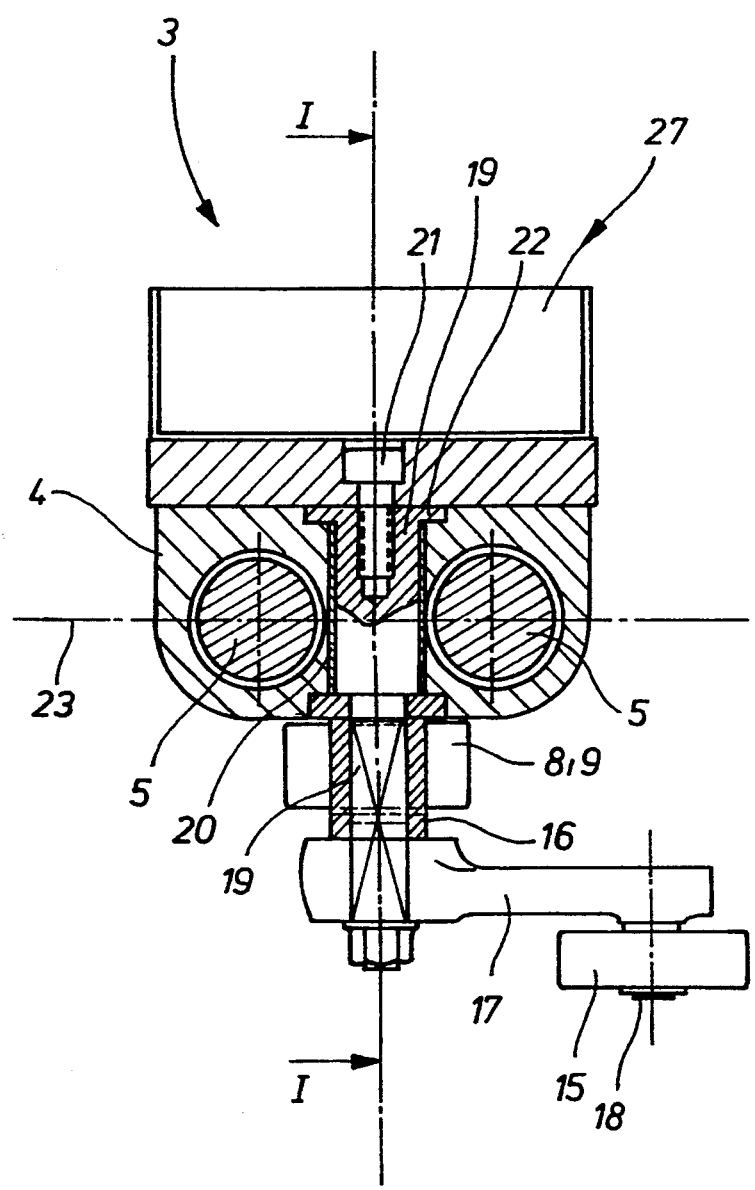
FIG. 2 is a section through the clip according to FIG. 1 in the direction of line II—II in FIG. 1.

FIG. 2 illustrates the sectional representation in relation to FIG. 1. In this connection it can be seen that a total of two chain bolts 5 each are disposed in a manner known per se in one rolling part 4, the chain bolts 5 being rotatably mounted in associated bushings in the rolling part 4.

It can further be seen that the adjusting shaft 19 is disposed centrally between the chain bolts 5 and supports at its rear end facing away from the film track, the lever 17 with the adjusting roller 15 disposed thereon. The clip table 27 is only illustrated schematically.

Figure 3A:
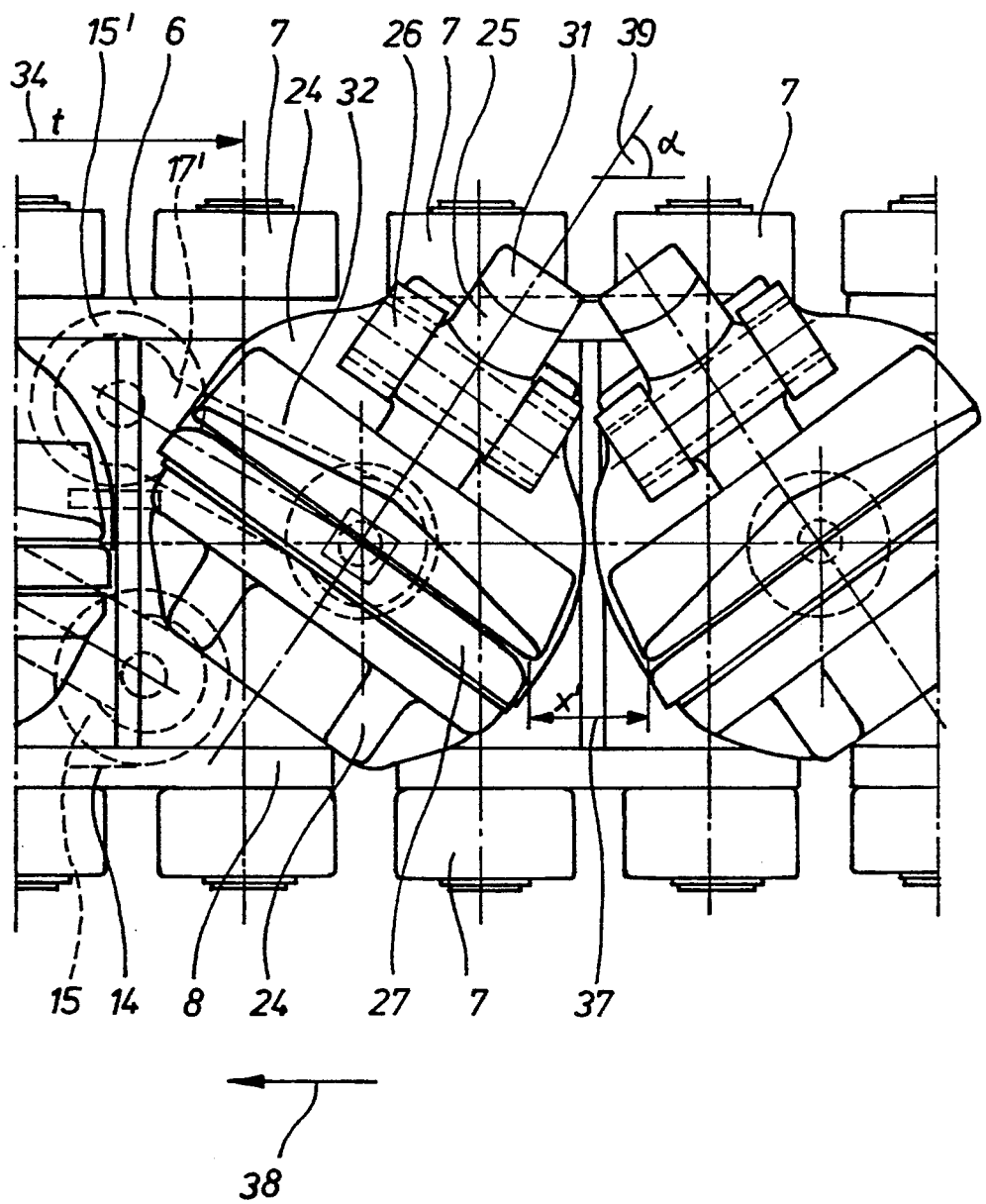
FIGS. 3a and 3b show side views of a clip conveyor in an embodiment using a clip according to FIG. 1, whereby

FIG. 3a illustrates an embodiment which differs from that of FIG. 4, in that in FIG. 3 each of the gripping parts 24 of adjacent clips 3 is pivoted in a direction opposite to the pivoting directions of a neighboring clip as shown by the pivoting angle 39. This opposite pivoting is achieved in that one clip 3 comprises a lever 17' which is directed obliquely upwards (FIG. 3 in the center) and which comprises at the top an adjusting roller 15', whereas the adjacent clip supports a downwardly directed lever 17 having a lower adjusting roller 15 disposed thereon. One lever 17' is thus disposed in the direction of movement 38 of the film while the other lever 17 is directed with its adjusting roller 15 in the opposite direction relative to the direction of movement 38 as illustrated.

Figure 3B:
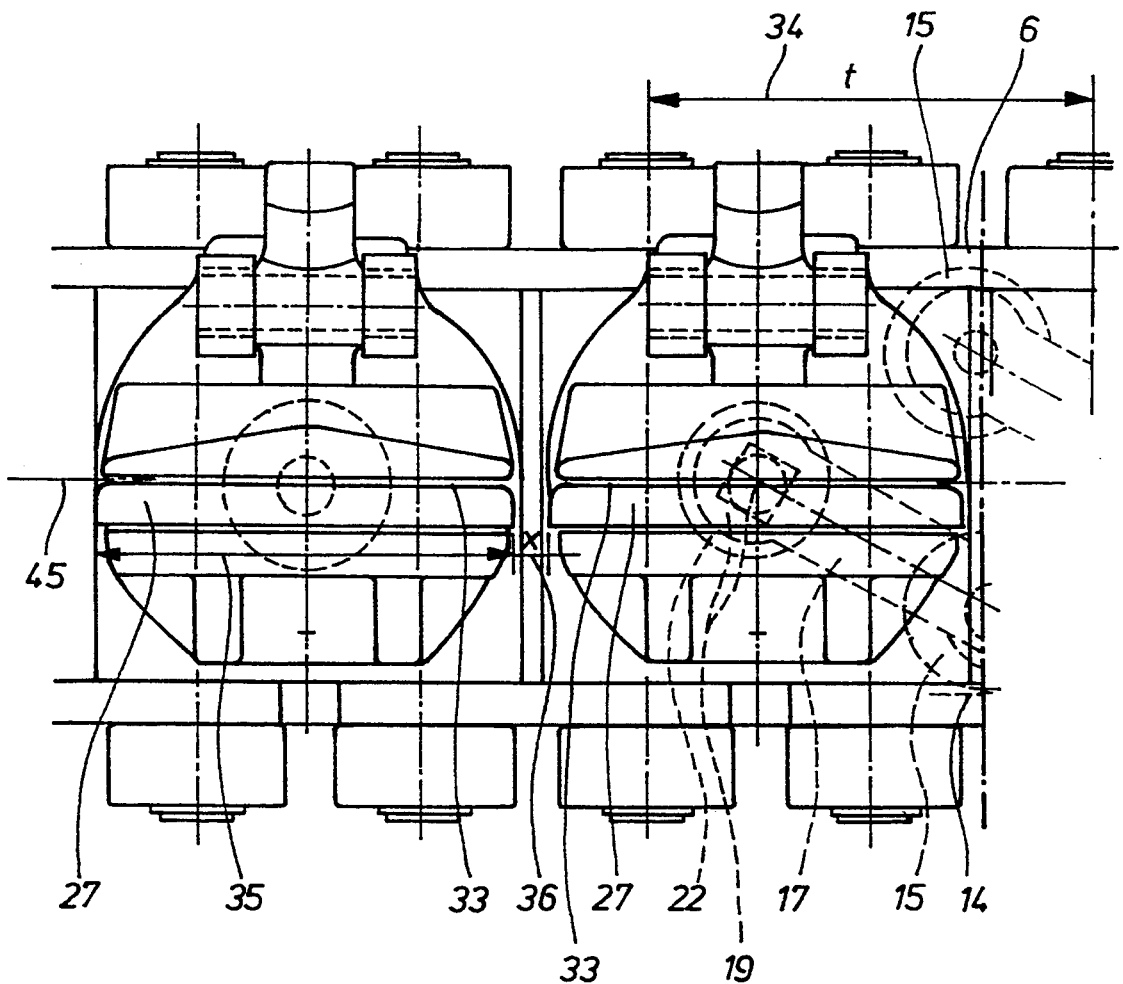

FIGS. 3a and 3b thus illustrate in principle two different operating states of the clip chain according to the invention. In this type of construction the levers 17, 17' and the rollers 15, 15' must be offset in the operating planes in order to operate satisfactorily and such that they do not collide when activated. With respect to the illustration in FIG. 3a which is graphically exaggerated, the pivoting angle 39 of the levers on the clips must be arranged such that only one guide path 14, 14' is required.

The two clips illustrated in FIG. 3a show the film clamped in an undulating manner whereas the two clips illustrated in FIG. 3b show the normal position of these clips in the shrinking area, whereby the clip tables form a flat path and are flush with one another such that the holding portions 33 lie in the plane of a straight guide path 45. The important factor in this connection is that the spacing of the chains 34 is not altered as a whole, which is an essential advantage with respect to the prior art.

As a result of the features according to the invention for pivoting the gripping parts 24 of the clips 3, only the distance 36 is altered with respect to the distance 37.

Before being introduced into the shrinking area, the distance of the table relative to the two adjacent clips and thus also the length of the clamped film 37 is X'. As described above, this distance may even exist when the film is clamped in or be set when it is pivoted within the machine. In the shrinking area this distance 37 is reduced to the distance 36 as a result of which the film between the adjacent clips now becomes loose and can be shrunk to the dimension X (distance 36). The table length 35 plus the distance 36 thus always determines the pitch dimension 34. The table length 35 plus the distance 37 is thus always greater than the pitch dimension 34. The difference between the two distances provides the dimension of the maximum possible shrinkage within one pitch dimension 34.

FIG. 4 shows a further embodiment of the present invention from which it is seen that the levers 17 are pulled in the direction of movement 38, i.e., the adjusting rollers 15 are in each case disposed at the rear as viewed in the direction of movement. In this connection the rollers 15 thus run on a common track 14 whereas, in FIG. 3, with the clips pivoted in different directions, two different tracks may be present.

In FIG. 3, however, it is also possible to use a uniform track—as in FIG. 4—and to arrange the levers 17 instead so that the geometric relationships according to FIG. 3 are achieved.

In the case of the embodiment according to FIG. 4 it is thus important that the gripping parts 24 are pivoted in the same direction whereas in FIG. 3 the gripping parts 24 are pivoted in different directions.

In accordance with the embodiment of FIG. 3, there is thus produced a film 40 which has an undulating nature—as illustrated in FIG. 5. Thus straight film sections 41, 42, 43 are present, each film section 41—43 being defined by the straight clip table 27.

It can be seen that the film 40 above and below a straight guide path 45 is deflected and the above-mentioned "overfeeding" of the film thus occurs, i.e. the film 40 is introduced into the inlet area of the machine such that it is longer in the undulating state and in the shrinking area this undulating form of the film 40 is converted into a straight guide path 45.

It can thus be seen that there is a longitudinal reserve 45 of the film which results from the difference between the dimension 47 and the length 48 between the points 49 and 50. This longitudinal reserve or dimension of difference is subject to shrinkage.

In the embodiment according to FIG. 6, which refers to FIG. 4, it can be seen that instead of the undulating film 40 a saw-tooth like film 40 is achieved. This is attained in that the clip tables 27 are all inclined in the same direction, as symbolized by the foil sections 41, 42 shown. In the vicinity of the sections 51 the film is free and is subject to shrinkage there.

The above-mentioned embodiments illustrate the fact that the adjusting rollers 15 roll on corresponding tracks 14, 14'. It is evidently possible within the scope of the present invention that these adjusting rollers 15 may roll in correspondingly profiled guide paths in order to avoid that the adjusting rollers 15 lift off for example when resilience occurs at the film. A form-locking guiding of the adjusting rollers 15 is thereby made possible. Forces may thus be transmitted by the levers 17 in both pivoting directions.

Although the invention has been described with reference to specific example embodiments, it will be appreciated that it is intended to cover all modifications and equivalents within the scope of the appended claims.

We claim:

1. An apparatus for treating a synthetic material film on a tentering chain conveyor, comprising two tentering chains forming said conveyor, a plurality of tentering clips carried by each tentering chain for gripping said synthetic material film along film edges, said tentering chains having chain links interconnected at a fixed chain pitch, each of said tentering clips having a clamping table and a clamping member cooperating with a table surface of said clamping table for gripping said film edges, and wherein a number of said tentering clips comprises journal means mounting at least a journal section of the respective tentering clip in a journalling manner to the corresponding tentering clip, and means for rotating said journal means so that said table surface of the respective tentering clip assumes an inclined position relative to a horizontal plane defined by a feed advance direction (38) of said synthetic material film through said apparatus, said inclined position of said number of tentering clips providing a film length for shrinking said synthetic material film in a longitudinal direction corresponding to said feed advance direction, whereby said fixed chain pitch remains constant.

2. The apparatus of claim 1, wherein each tentering clip of said number of tentering clips comprises in addition to said journal section (24) a fixed section (4) secured to one of said tentering chains, and wherein said journal means comprise an adjusting shaft (19) passing rotatably through said fixed section of said tentering clip, said journal section being connected to said adjusting shaft, and wherein said means for rotating drive said adjusting shaft (19) for bringing said table surface into said inclined position.

3. The apparatus of claim 1, wherein said number of tentering clips corresponds to a total number of tentering clips of said tentering chain conveyor, whereby each tentering clip is equipped with said journal section.

4. The apparatus of claim 1, wherein every alternate tentering clip is equipped with said journal section.

5. The apparatus of claim 1, wherein each third tentering clip is equipped with said journal section.

6. The apparatus of claim 1, wherein said journal means comprise an adjusting shaft (19) connected to said journal section of said respective tentering clip, said means for rotating comprising a crank lever (17) connected to said adjusting shaft for rotating said adjusting shaft and an adjusting roller (15) rotatably mounted to a free end of said crank lever (17), said means for rotating further comprising a guide track (14, 14') for said adjusting roller (15), said guide track (14, 14') having different distances from said horizontal plane along said guide track for pivoting said journal section of said respective tentering clip.

7. The apparatus of claim 6, wherein said adjusting roller (15) at said free end of said crank lever (17) faces rearwardly relative to said feed advance direction (38), whereby said adjusting roller assumes a trailing attitude.

8. The apparatus of claim 6, wherein said adjusting roller (15') at said free end of said crank lever (17') faces forwardly relative to said feed advance direction (38), whereby said adjusting roller assumes a leading attitude.

9. The apparatus of claim 6, wherein said means for rotating are configured for tilting neighboring journal sections of said number of tentering clips in opposite directions relative to each other, whereby said journal sections shape said synthetic material film to form an undulating wave form.

10. The apparatus of claim 6, wherein said means for rotating are configured for tilting neighboring journal sections of said number of tentering clips in the same directions relative to each other, whereby said journal sections shape said synthetic material film to form a saw-tooth wave form.

11. The apparatus of claim 6, wherein each tentering clip of said number of tentering clips comprises in addition to said journal section (24), a fixed section (4) secured to one of said tentering chains, said journal means further comprising a bushing (20) for mounting said adjustment shaft (19) rotatable relative to said fixed section (4), said adjusting shaft (19) being rigidly connected to said journal section (24) of the respective tentering clip, and wherein said adjustment shaft (19) comprises a larger diameter flange (22) positioned between said fixed section (4) and said journal section.

12. The apparatus of claim 11, wherein said journal means comprise a further bushing (16) opposite said first mentioned bushing (20), said further bushing (16) having a radial extension axially bearing against said fixed section (4) of the respective tentering clip, said adjusting shaft (19) having a shaft section extending out of said fixed section of the respective tentering clip and axially through said further bushing (16), whereby said further bushing forms a spacer between said fixed section (4) and said means for rotating said journal means for transferring a tensile force from said adjusting shaft (19) into said fixed section (4) of the respective tentering clip.

* * * * *

UNITED STATES PATENT AND TRADEMARK OFFICE
CERTIFICATE OF CORRECTION

PATENT NO. : 5,390,398
DATED : February 21, 1995
INVENTOR(S) : Rutz et al

It is certified that error appears in the above-indentified patent and that said Letters Patent is hereby corrected as shown below:

On the title page: Item

The Foreign Priority Data should read as follows:

--[30]  Foreign Application Priority Data
July 16, 1991 [DE] Germany ....................4123476--.

Signed and Sealed this

Twenty-fifth Day of April, 1995

Attest:

BRUCE LEHMAN

*Attesting Officer*   *Commissioner of Patents and Trademarks*